Dec. 26, 1967     J. J. BOOTH     3,359,748

SLUSH CO₂ CONTROL

Filed March 25, 1966     2 Sheets-Sheet 1

INVENTOR
JACK J. BOOTH

Richards Harris & Hubbard

ATTORNEY

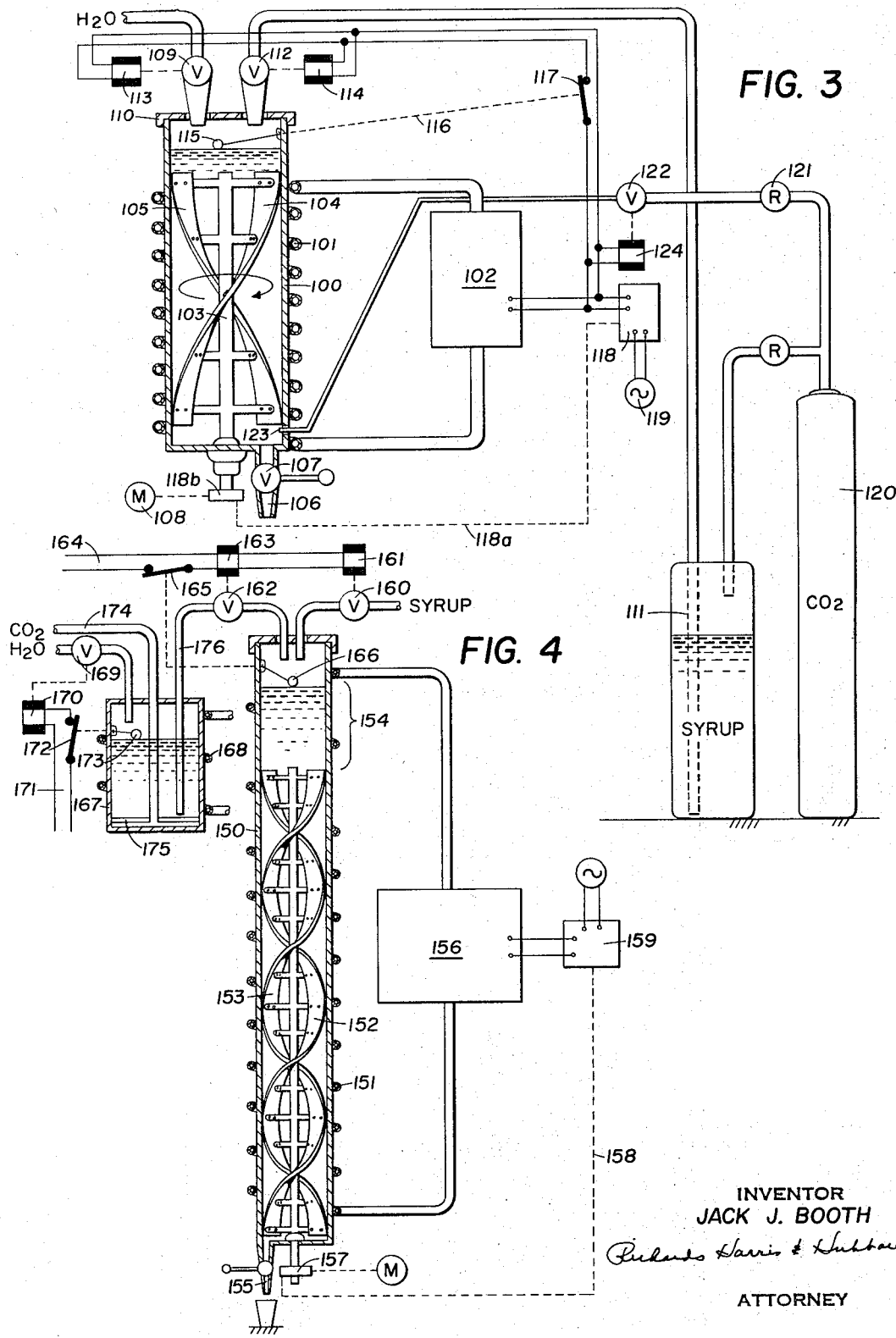

United States Patent Office 3,359,748
Patented Dec. 26, 1967

3,359,748
SLUSH CO₂ CONTROL
Jack J. Booth, P.O. Box 10872,
Dallas, Tex. 75207
Filed Mar. 25, 1966, Ser. No. 537,406
4 Claims. (Cl. 62—136)

This invention relates to carbonation of beverages and more particularly to the control of carbonation gas in a beverage which is chilled to form a slush.

Heretofore, systems have been provided for producing carbonated beverages in slush form where, until dispensed, the supply of the beverage is maintained at pressures above atmospheric pressure. The present invention is directed to an improvement over such systems, and specifically provides for the operation of a slush forming and storage system at atmospheric pressure, while assuring an adequate level of carbonation, and represents an improvement over systems such as disclosed in U.S. Patent No. 3,044,878 to Knedlik and U.S. Patent No. 3,108,449 to Lents.

In accordance with the present invention, a system having means for partially solidifying a beverage mixture is also provided with a carbonation control. The carbonation control involves means for introducing $CO_2$ gas into a chilled mixture to be dispensed as a slush where the chilled mixture containing the $CO_2$ gas is maintained at atmospheric pressure.

In accordance with one aspect of the invention, a slush beverage is produced in a freezing chamber maintained at atmospheric pressure. A liquid is delivered to the chamber and agitated continuously to clear the walls of the chamber of crystals developed from the liquid. A dispensing spout leads from the chamber. Means are provided for establishing and maintaining at least the portion of material in the chamber adjacent to the dispensing spout substantially saturated with carbonation gas. This is accomplished preferably by introducing carbonation gas through a port in the region of the spout but located for movement of gas away from the spout by agitation.

In a further aspect of the invention, flow of carbonation gas is limited to the time intervals of flow of a refrigerant to the freezing chamber. In a further aspect of the invention, a carbonated slush is produced to which flavor is added in the course of dispensing the slush from the freezing chamber.

In a still further aspect, means are provided for introducing carbonated gas into the chamber adjacent to a dispensing spout and for selectively introducing any one of a plurality of flavors into the flow of slush as dispensed from the freezing chamber.

For a more complete understanding of the present invention and for further objects and advantages thereof, reference may now be had to the following description taken in conjunction with the accompanying drawings in which:

FIGURE 3 illustrates a modified system with vertical orientation for the chilling chamber;

FIGURE 4 illustrates a system employing carbonation in a separate vessel with an agitating chamber of extended storage capacity;

In accordance with known procedures such as disclosed in the patents above identified, a mixture of a liquid syrup or fruit concentrate, water, and the carbonating gas are to be so controlled as to temperature, pressure, and other conditions, such that a drink is dispensed from the chamber and into a container open to the atmosphere wherein some portions thereof are frozen or crystallized, with the frozen particles or crystals being of substantially the same concentration and flavor as the liquid phase of the drink. The present invention eliminates the necessity for maintaining the freezing chamber at a superatmospheric pressure during production of a liquid and crystal mixture.

Figure 1:
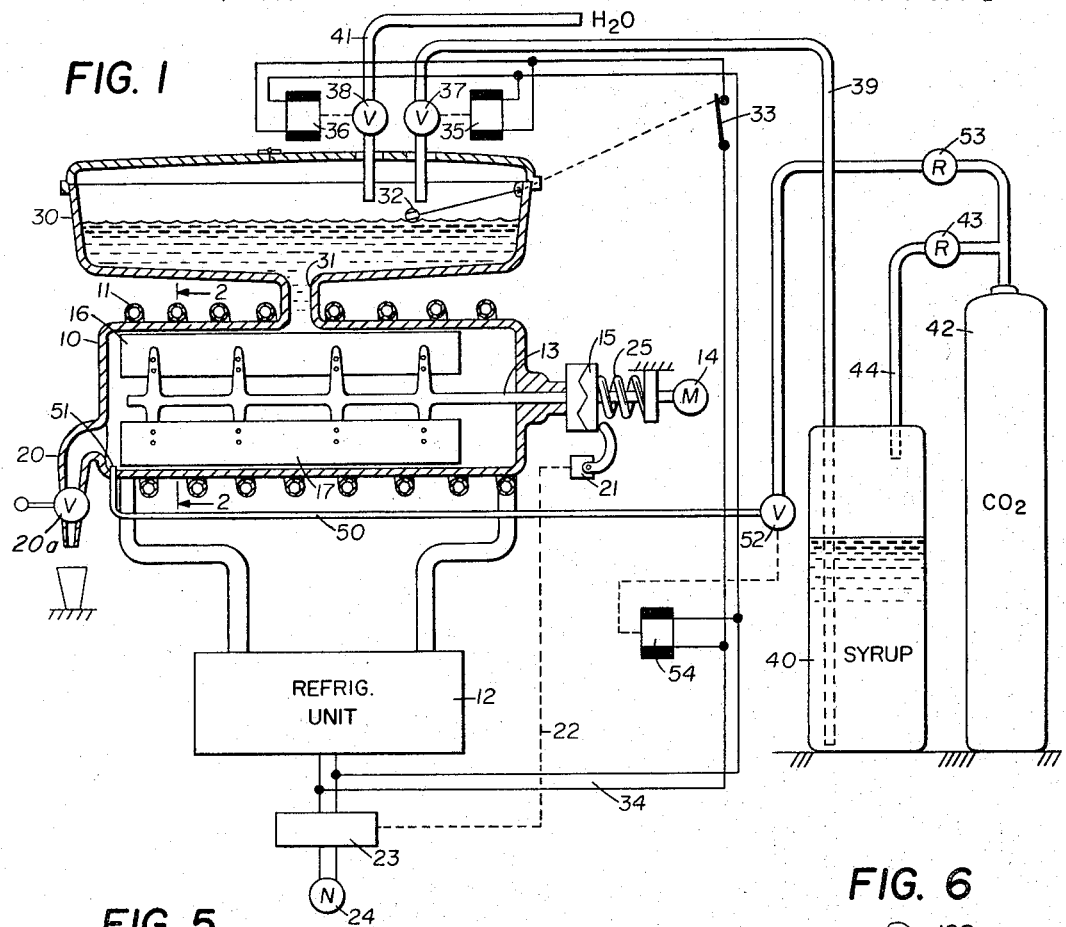
FIGURE 1 is a first embodiment of a system employing the present invention.

As shown in FIGURE 1, a temperature control chamber 10 in the form of an elongated cylinder is provided with a freezing coil 11 forming part of a refrigeration system which includes a refrigeration unit 12. The chamber 10 is provided with a central shaft 13 which is driven from a motor 14 by way of a clutch 15. The shaft 13 is coupled to blades 16 and 17 which scrape the walls of the chamber 10 to remove solids as they form. The chamber 10 has a dispensing spout 20 controlled by a manually-operated valve 20a. Liquid in the chamber 10 is agitated by blades 16 and 17 while its temperature is lowered by the flow of refrigerant in the freezing coil 11, so that the mixture within the chamber 10 achieves a form of slush.

As more fully shown in Patent No. 3,108,449, the refrigeration unit 12 is cycled intermittently in response to the torque on the shaft 13. The position of clutch 15 is sensed by a sensing unit 21 which is linked as by the linkage 22 to the control unit 23. The control unit 23 serves to selectively apply power from a source 24 to the refrigeration unit 12 when the mixture in chamber 10 offers resistance to blades 16 and 17 below a given level and to discontinue refrigeration when the mixture offers resistance above such level.

More particularly, when the mixture in the chamber 10 becomes too stiff, the elements of clutch 15 will separate, working against the force of a spring 25. The sensor 21 will then deenergize the refrigeration unit when the force reaches a predetermined level. It will be understood that other forms of torque-sensing systems are now known and are used in a system of the type to which the present invention applies.

In accordance with the embodiment of the invention shown in FIGURE 1, the pressure within the chamber 10 is maintained at atmospheric pressure. More particularly, a pre-cooling or storage reservoir 30 is mounted immediately above the chamber 10 and is coupled thereto by way of a channel 31. Thus, liquid may flow from the storage chamber 30 to the chamber 10 by gravity through the channel 31. A given liquid level is maintained in the chamber 30 by means of a float 32 which controls a switch 33. Switch 33 is in the supply line 34 leading from the control unit 23. When the refrigeration unit 12 is actuated, the line 34 is energized. When the switch 33 is closed, the solenoids 35 and 36 open the valves 37 and 38 to introduce syrup and water, respectively. Line 39 is connected to a syrup supply tank 40. Line 41 is connected to a culinary water supply. The syrup tank 40 is pressurized from a $CO_2$ tank 42. Tank 42 is connected by way of a regulator valve 43 to a line 44 leading to the top of the syrup tank. As thus far described, the system provides for maintenance of an adequate supply of water and syrup suitably mixed in the storage tank 30 and thus available to the freezing chamber 10.

In accordance with the embodiment of the invention shown in FIGURE 1, $CO_2$ gas is introduced into the chamber 10 by way of a line 50 which enters the chamber 10 at point 51, immediately adjacent the dispensing spout 20. The line 50 is connected by way of valve 52 and regulator 53 to the $CO_2$ tank 42. The valve 52 is controlled by a solenoid 54 which is connected to the line 34.

Thus, in accordance with one aspect of the invention, $CO_2$ gas is introduced and permitted to bubble through the slush material in the container 10 during intervals when the refrigeration unit 12 is in operation. As refrigeration action takes place, the liquid in the chamber 10 is reduced in temperature and thus is rendered capable of absorbing more and more $CO_2$ gas. It has been found that in operation of such a system, the gas may be introduced at a suitable rate to maintain an adequate level of carbonation in the materials within the chamber 10 while avoiding any loss through the reservoir 30. Thus, in accordance with this invention, means are provided for loading a water and syrup mixture with a carbonating gas, with the mixture thus carbonated being reduced to a crystalline-liquid mixture while at atmospheric pressure.

Figure 2:
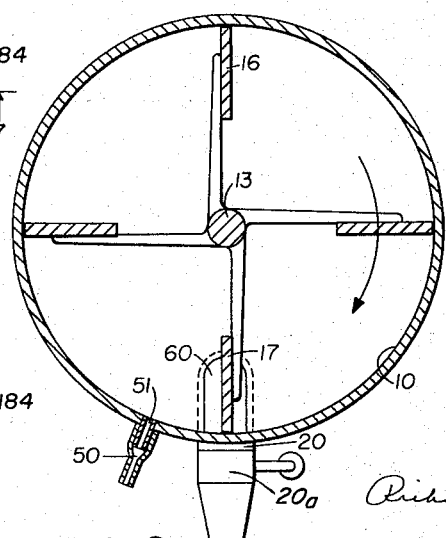
FIGURE 2 is a sectional view taken along lines 2—2 of FIGURE 1.

As best shown in FIGURE 2, the chamber 10 in cylindrical form has the shaft 13 supporting a plurality of blades 16 and 17. In this embodiment, the blades rotate in a clockwise direction. The rotation of the blades serves to wipe the semi-frozen material from the walls of the chamber 10 and to float it in the liquid syrup matrix. At the same time, the blades serve to force the semi-solid material through the opening 60 leading to the spout 20. The $CO_2$ tube 50 enters the chamber 10 at point 51 immediately downstream of the port 60 so that the gas introduced into the chamber 10 will be swept with the fluid driven by the paddles 16 and 17 away from the spout 20 and thus will be mixed with the contents of the chamber 10 and will be permitted to be absorbed by the contents.

Thus, while a carbonated beverage is produced, there is avoided the necessity of a high-pressure vessel. At the same time, the highest concentration of carbon dioxide is present immediately adjacent the output of the system, with the remainder of the system providing a sink for all $CO_2$ gas above that necessary to saturate the volume immediately adjacent the output end. By means of this system, a cool, carbonated, flavored drink, of the consistency of about 12 Brix, at a temperature of freezing or below, is dispensed with a slush-type consistency. It will remain in a semi-frozen state for several minutes. A highly satisfactory drink has been found to be obtained by adding the $CO_2$ gas to the mixture just prior to dispensing the same, rather than to try to precarbonate the beverage before it is placed in the dispenser. This may be accomplished with far less equipment than otherwise would be necessary. This is accomplished by introducing the $CO_2$ gas through the chamber wall of the freezing and agitating compartment adjacent to the output preferably during the same time intervals that the dispenser is in the refrigeration cycle. This serves to establish a higher volume of $CO_2$ gas within the mixture immediately adjacent the dispensing point, and therefore dispense a higher carbonated product from the system. This also gives a lighter product by weight because of the increased amount of gas in the dispensed product, thereby allowing for more volume of finished product per given amount of ingredients.

It will be recognized that the flow of $CO_2$ gas could be continuous or it may be cycled with the refrigeration unit to conserve the $CO_2$ gas. A wholly satisfactory product has been found to be produced by cycling the $CO_2$ gas with the refrigeration unit as shown in FIGURES 1 and 2.

FIGURE 3 illustrates a modification of the invention wherein chamber 100 is provided with coil 101 as to be chilled through the action of a refrigeration unit 102. The chamber 100 is of cylindrical form and is oriented with its axis vertical. A central shaft 103 carries blades 104 and 105 for agitating the mixture therein. A dispensing nozzle 106 is provided with a valve 107. Motor 108 coupled to shaft 103 serves to drive the blades 104 and 105. Water from a supply line is introduced by way of valve 109 through the lid 110 on the chamber 100. Syrup from tank 111 is introduced through the lid 110 by way of valve 112. Solenoids 113 and 114 control valves 109 and 112, respectively. A float 115 coupled by linkage 116 to switch 117 controls the energizing circuit for solenoids 113 and 114. The control unit 118 coupled by linkage 118a to a torque sensor unit 118b controls energization of the refrigeration unit and the solenoids 113 and 114 from the source 119. $CO_2$ gas from tank 120 passes by way of regulator 121 and valve 122 to an input port 123 at the bottom of the chamber 110 adjacent to the dispensing valve 106. Solenoid 124 controls valve 122 and serves to admit $CO_2$ gas to the chamber 100 during periods when the refrigeration unit is energized.

In this embodiment, as in the embodiment of FIGURE 1, the chamber 100 is operated at atmospheric pressure. Differing from the embodiment of FIGURE 1, the system of FIGURE 3 employs chamber 100 vertically oriented with the float 115 maintained in the same chamber. The chamber 100 may be varied in relative proportions as to length and diameter on one hand, and as to length compared to the height of the agitating blades on the other hand. However, $CO_2$ gas is introduced into a chilled mixture and is maintained in the chilled mixture at atmospheric pressure.

In the embodiment of FIGUGRE 4, chamber 150 has a substantially greater length-to-diameter ratio than the vertical tank of FIGURE 3. Refrigeration coil 151 is highly concentrated over the lower portion thereof spanned by the agitating blades 152 nd 153, and is less concentrated over the upper section 154. The upper section 154 serves as a storage reservoir for liquids which are delivered to the lower portion as they are frozen for delivery through the dispensing nozzle 155. Refrigeration unit 156, as in the other embodiments, is controlled by a torque sensor 157 coupled by way of linkage 158 to a control unit 159.

In this embodiment, syrup is fed into the upper end of the chamber 150 by way of a valve 160 controlled by a solenoid 161. Carbonated water is fed into the upper end of chamber 150 by way of valve 162 controlled by solenoid 163. The energizing circuit 164 for solenoids 161 and 163 is controlled by switch 165 which is actuated by float 166.

A carbonation chamber 167 is provided with a refrigeration coil 168 to maintain the contents thereof chilled. Water is supplied to the pressurized chamber 167 by way of a valve 169 which is controlled by a solenoid 170. The energizing circuit 171 for the solenoid 170 is controlled by way of switch 172 which in turn is controlled by a float 173. $CO_2$ gas is fed into the bottom of the chamber 167 by way of a supply line 174. It is permitted to bubble upward through the liquid in the chamber 167 through a porous body 175. A tube 176 leading to the valve 162 from the bottom of the chamber 167 serves to deliver chilled carbonated water into the top of the chamber 150 under the control of the solenoid 163. In this case, as in FIGURES 1 and 3, a slush-forming chamber is operated at atmospheric pressure with a substantially saturated carbonated water-syrup mixture therein.

The foregoing description has assumed the introduction of a syrup and water into the reservoir 30 of FIGURE 1 or into the cylinders 100 and 150 of FIGURES 3 and 4, respectively. In accordance with another mode of operation, a carbonated slush is produced and dispensed with addition of either a flavor or essence at the dispensing spout.

Figure 5:
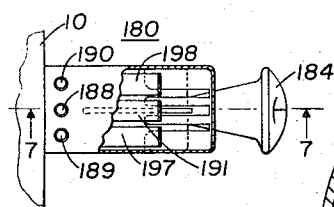
FIGURE 5 is a top view partially in section of a multi-flavor control and dispensing valve.
Figure 7:
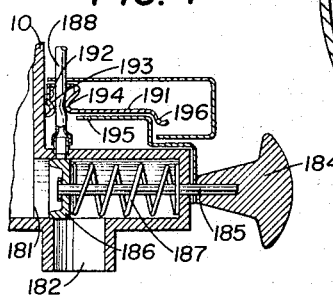
FIGURE 7 is a sectional view taken along lines 7—7 of FIGURE 5.
Figure 6:
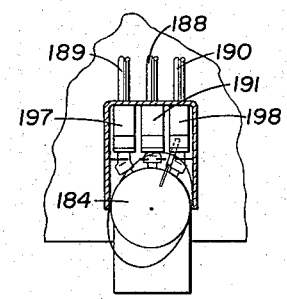
FIGURE 6 is a front view partially in section of the valve of FIGURE 5.

Such a system is shown in FIGURES 5–7. In place of the spout 20 and dispensing valve 21 of FIGURE 1, for example, the dispensing spout 180 of FIGURES 5–7 may be employed. The spout 180 is mounted on the front of the chamber 10 and is provided with an inlet port 181 and an outlet spout 182. The valve includes a knob 184 mounted on a shaft 185. A stop 186 is mounted on the top end of the shaft 185 with a spring 187 normally biasing the stop 186 into a closed position. When the knob 184 is pulled away from the chamber 10, flow of the slush in the chamber 10 through the output spout 182, produced by action of the dasher in chamber 10, is permitted.

It will be noted that the stop 186 is a dished disk having cylindrical outer walls. The outer wall in the closed position engages the end of the syrup or flavor supply tube 188. From FIGURE 5, will be noted that there are three supply tubes including the center tube 188, tube 189, and tube 190. Thus, three flavors may be selected in connection with use of this dispensing spout, if the tubes 188–190 are connected to different flavor supply sources.

As shown in FIGURE 6, the flavor tubes 188–190 extend through different ports leading to the interior of the dispensing spout. As shown in FIGURE 7, each of the flavor tubes is normally stopped by individual spring stoppers, such as formed by the spring 191. Spring 191 is secured to chamber 10 as by a screw 192. The tube 188 passes through a central aperture in the spring 191, and then between a lower ridge 193 and a curved portion 194. Normally, the spring 191 permits flow of syrup through the tube 188. When the knob 184 is pulled away from the chamber 10, an arm 195 secured to the knob 184 engages the spring end 196 to open the tube 188 for flow. Thus, whenever slush flows from chamber 10, flavoring liquid flows through the tube 188 or one of tubes 189 and 190.

More particularly, as shown in FIGURE 5, three closure springs 191, 197, and 198 are provided. Flavor selection is thus carried out by rotating the knob 184 to one of the three possible positions indicated in FIGURE 6. Only one flavor normally will be introduced at a time, although the knob 184 may be rotated to a position midway between two of the springs 191 and 197 or 191 and 198 to permit flow simultaneously of two flavors.

Such a valve may be employed to introduce either a flavor alone or a flavored syrup into the flow of slush from the machine. In the latter case, only water and $CO_2$ gas would be involved in the slush-producing operation in chamber 10. In any case, $CO_2$ gas is introduced adjacent to the outlet of a slush-forming zone maintained under agitation at atmospheric pressure to provide a substantially saturated solution at the dispensing point and eliminating any requirement for a pressure-tight machine.

Having described the invention in connection with certain specific embodiments thereof, it is to be understood that further modifications may now suggest themselves to those skilled in the art and it is intended to cover such modifications as fall within the scope of the appended claims.

What is claimed is:
1. A dispenser flavor selector for a slush beverage machine which comprises:
   (a) structure forming a flow channel communicating with said machine with a normally closed stop therein,
   (b) a plurality of flexible flavor lines leading to said structure and communicating with said channel,
   (c) stop means normally biased against said flexible flavor lines to radially deform said flavor lines in order to prevent flavor flow therethrough,
   (d) a control handle for actuating said stop to initiate flow of slush from said machine through said channel, and
   (e) means selectively actuated by movement of said handle in a different sense for selectively moving said stop means away from one of said flavor lines to open the flavor line to mix flavor with said slush during dispensing thereof.

2. In the production of a slush beverage, the combination which comprises:
   (a) a freezing chamber maintained at atmospheric pressure for receiving a liquid therein,
   (b) agitation means for continuously developing agitating forces in said chamber to clear the walls of said chamber of crystals developed from said liquid,
   (c) a dispensing spout leading from said chamber,
   (d) means for introducing carbonation gas into said chamber in a region of said spout for initial movement of said gas away from said spout by said agitation means, said means maintaining at least the portion of material in said chamber adjacent to said dispensing spout substantially saturated with carbonation gas,
   (e) means for starting and stopping heat removal of said chamber in response to high and low torque levels on said agitation means, and
   (f) control means for starting and stopping flow of carbonation gas concurrently with heat removal.

3. In the production of a slush beverage, the combination which comprises:
   (e) a freezing chamber maintained at atmospheric pressure for receiving a liquid therein,
   (b) agitation means for continuously developing agitating forces in said chamber to clear the walls of said chamber of crystals developed from said liquid,
   (c) a dispensing spout leading from said chamber,
   (d) means for introducing carbonation gas into said chamber in a region of said spout for initial movement of said gas away from said spout by said agitation means, said means maintaining at least the portion of material in said chamber adjacent to said dispensing spout substantially saturated with carbonation gas, and
   (e) said chamber being of cylindrical configuration vertically oriented with said dispensing spout located adjacent to the bottom thereof and the gas injection point located at a point below the top thereof.

4. In the production of a slush beverage, the combination which comprises:
   (a) a freezing chamber maintained at atmospheric pressure for receiving a liquid therein,
   (b) agitation means for continuously developing agitating forces in said chamber to clear the walls of said chamber of crystals developed from said liquid,
   (c) a dispensing spout leading from said chamber,
   (d) means for introducing carbonation gas into said chamber in a region of said spout for initial movement of said gas away from said spout by said agitation means, said means maintaining at least the portion of material in said chamber adjacent to said dispensing spout substantially saturated with carbonation gas, and
   (e) said chamber being in the form of a vertical cylinder with refrigeration coils disposed along the length thereof for maximum heat removal rate at the bottom and minimum heat removal rate at the top of the cylinder.

References Cited
UNITED STATES PATENTS

| | | | |
|---|---|---|---|
| 850,916 | 4/1907 | Fitzgibbon et al. | 222—144.5 |
| 2,134,787 | 11/1938 | Hartman | 62—70 |
| 2,888,040 | 5/1959 | Terwilliger et al. | 222—144.5 X |
| 3,015,420 | 2/1962 | Chudnow | 222—144.5 |
| 3,141,573 | 7/1964 | Patch et al. | 222—144.5 X |
| 3,196,633 | 7/1965 | Rapazzini et al. | 62—136 X |
| 3,256,100 | 6/1966 | Bernstein et al. | 62—342 X |

WILLIAM J. WYE, *Primary Examiner.*

ROBERT A. O'LEARY, *Examiner.*

W. E. WAYNER, *Assistant Examiner.*